(12) United States Patent
Doutheau et al.

(10) Patent No.: US 6,393,300 B1
(45) Date of Patent: *May 21, 2002

(54) DEVICE FOR CONNECTING A TELEPHONE SWITCH TO A FIXED TELEPHONE NETWORK VIA A RADIO TELEPHONE NETWORK

(75) Inventors: Olivier Doutheau, Paris; Jean-Pierre Aucoeur, Cormeilles; Jean-Francois Criqui, Asnieres; Jean-Noël Martin, L'Huisserie; Jean Charpentier, Viroflay, all of (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/269,271

(22) PCT Filed: Aug. 6, 1998

(86) PCT No.: PCT/FR98/01751

§ 371 Date: Mar. 25, 1999

§ 102(e) Date: Mar. 25, 1999

(87) PCT Pub. No.: WO99/08459

PCT Pub. Date: Feb. 18, 1999

(30) Foreign Application Priority Data

Aug. 11, 1997 (FR) ............................................ 97 10261

(51) Int. Cl.[7] .............................. H04B 1/38; H04M 1/66

(52) U.S. Cl. ...................... 455/555; 455/558; 455/560; 455/411

(58) Field of Search .................................. 455/411, 12.1, 455/426, 456, 552, 555, 553, 403, 463, 560, 561, 554, 558; 340/825.3, 825.31, 825.34; 380/247, 248, 249, 255, 270; 713/155, 153, 162, 163

(56) References Cited

U.S. PATENT DOCUMENTS 4,193,131 A * 3/1980 Lennon et al. ................. 380/25
4,411,017 A * 10/1983 Talbot .......................... 380/31
4,549,308 A * 10/1985 LoPinto ........................ 380/21

(List continued on next page.)

FOREIGN PATENT DOCUMENTS

| EP | 0 169 726 A2 | 1/1986 | |
| EP | 583233 | * 2/1994 | ............ H04Q/7/04 |
| GB | 2 287 855 A | 9/1995 | |
| WO | WO 95/29565 | 11/1995 | |
| WO | WO 95/32590 | 11/1995 | |
| WO | WO 96/04759 | 2/1996 | |
| WO | WO 97/13380 | 4/1997 | |

*Primary Examiner*—Vivian Chin
*Assistant Examiner*—Charles N. Appiah
(74) *Attorney, Agent, or Firm*—Sughrue Mion, PLLC

(57) ABSTRACT

Apparatus for connecting telephone switch to fixed telephone network or PSTN via a radiotelephone network of GSM type or type derived therefrom. A fixed radiotelephone terminal (RT) has a processor that identifies calls containing an identity belonging to a predetermined set of international mobile subscriber identities (IMSIs), and calls containing an identity belonging to a predetermined set of temporary mobile subscriber identities (TMSIs), both of the sets corresponding to user terminals (UT1, . . . , UT10) which are connected to the switch. The radiotelephone network issues a distinct invoice for each user terminal (UT1, . . . , UT10) even though the same fixed radiotelephone terminal (RT) is used by a plurality of different users, and the radiotelephone network can perform direct inward dialing to each user terminal (UT1, . . . , UT10).

6 Claims, 2 Drawing Sheets

U.S. PATENT DOCUMENTS

| | | | | |
|---|---|---|---|---|
| 4,573,205 A | * | 2/1986 | Nash | 380/6 |
| 4,658,096 A | * | 4/1987 | West, Jr. et al. | 455/74.1 |
| 5,081,703 A | | 1/1992 | Lee | 455/13.1 |
| 5,091,942 A | * | 2/1992 | Dent | 380/46 |
| 5,181,243 A | * | 1/1993 | Saltwick et al. | 380/6 |
| 5,222,140 A | * | 6/1993 | Beller et al. | 380/30 |
| 5,375,251 A | * | 12/1994 | Pfundstein | 455/551 |
| 5,490,284 A | | 2/1996 | Itoh et al. | 455/428 |
| 5,557,654 A | * | 9/1996 | Maenpaa | 455/411 |
| 5,564,072 A | * | 10/1996 | Aguilera et al. | 370/337 |
| 5,596,624 A | | 1/1997 | Armbruster et al. | 455/435 |
| 5,600,708 A | * | 2/1997 | Meche et al. | 455/411 |
| 5,765,105 A | * | 6/1998 | Kuriki | 455/410 |
| 5,787,355 A | * | 7/1998 | Bannister et al. | 455/458 |
| 5,864,757 A | * | 1/1999 | Parker | 455/418 |
| 5,884,168 A | | 3/1999 | Kolev et al. | 455/432 |
| 5,889,861 A | * | 3/1999 | Ohashi et al. | 380/21 |
| 5,930,708 A | * | 7/1999 | Stewart et al. | 455/428 |
| 5,940,512 A | * | 8/1999 | Tomoike | 380/25 |
| 5,983,117 A | * | 11/1999 | Sandler et al. | 455/557 |
| 6,035,178 A | | 3/2000 | Chennakeshu et al. | 455/12.1 |
| 6,064,891 A | * | 5/2000 | Aucoeur | 455/555 |
| 6,137,885 A | * | 10/2000 | Totaro et al. | 380/247 |
| 6,311,073 B1 | * | 10/2001 | Charpentier et al. | 455/560 |
| 6,421,084 | * | 11/2001 | Horrer | 455/431 |

* cited by examiner

DEVICE FOR CONNECTING A TELEPHONE SWITCH TO A FIXED TELEPHONE NETWORK VIA A RADIO TELEPHONE NETWORK

BACKGROUND OF THE INVENTION

The invention relates to apparatus for connecting a telephone switch to a fixed telephone network via a radiotelephone network, with one or more fixed radiotelephone terminals being used to replace a cable link. Each fixed radiotelephone terminal performs functions analogous to those performed by a conventional portable radiotelephone terminal, but it connects the fixed telephone network to a switch instead of connecting it to a single user. The apparatus of the invention may be used to connect a public switched telephone network to a switch serving a hotel, or a village, situated in an isolated region for which laying or a cable or installing some other terrestrial infrastructure would be too costly. The switch serves a group of fixed user terminals by routing calls coming from the public network. Each radiotelephone terminal is used successively for different user terminals because the user terminals are not used continuously. A plurality of radiotelephone terminals can share the same frequency band by means of time division or code division.

The invention relates more particularly to radiotelephone networks of the GSM type, and to those of types derived from the GSM type. Such a network includes a geostationary satellite or Low Earth Orbit (LEO) satellites. A GSM-type network has the following characteristics:

a geographical zone is subdivided into cells, to enable carrier frequencies to be re-used;

a gateway manages the resources of each cell, as regards carrier frequencies and the plurality of channels carried by each carrier frequency; and at least one switching center of the radio mobile service manages calls, connections with the fixed telephone network, and databases containing: the directory number, the international mobile subscriber identity number, and the location of each mobile subscriber.

Conventional GSM networks are not designed to enable a plurality of subscribers to use the same user terminal. The user personalizes the terminal used by inserting a "Subscriber Identity Module" ("SIM") card into the terminal, which card contains an "International Mobile Subscriber Identity" ("IMSI") which determines the account to which calls are charged. After an initialization stage, the terminal is designated in the radio messages by a "Temporary Mobile Subscriber Identity" ("TMSI") which serves to protect the anonymity of the user. In addition, an authentication procedure uses a secret key contained in the SIM card to prevent any unauthorized users from using the IMSI or the TMSI of another user, when a call is made or when a call is received.

Using the same radiotelephone terminal for different users thus raises the following problems:

it is necessary for it to be possible to issue distinct invoices for user terminals who have used the same fixed radiotelephone terminal;

it is necessary to select automatically that user terminal which is to receive each of the calls successively forwarded by the same fixed radiotelephone terminal to the switch; and it is necessary to authenticate the radiotelephone terminal that answers a call, even though that terminal is not dedicated to a single user.

Document GB 2 293 524 describes a method making it possible to solve those problems, but that method makes it necessary to modify certain items of equipment in the radiotelephone network used. An object of the invention is to propose apparatus that solves the above-mentioned problems, while making it possible to use a GSM network or a network derived from the GSM type without it being necessary to modify the network.

SUMMARY OF THE INVENTION

The invention provides apparatus for connecting a telephone switch to a fixed telephone network or "public switched telephone network" via a radiotelephone network or "public land mobile network"; a plurality of user terminals being connected to the telephone switch; the apparatus including at least one fixed radiotelephone terminal including means for communicating with the radiotelephone network; said apparatus being characterized in that it includes means for authenticating the radiotelephone terminal by using the same key for all calls received or transmitted via said fixed radiotelephone terminal.

The apparatus characterized in this way does not require a conventional or derived GSM network to be modified. It is necessary merely to allocate the same key to all of the user terminals connected to the switch in question.

In a preferred embodiment, the international mobile subscriber identities (IMSIs) identified by the apparatus are identical apart from n digits, where n is an integer lower than the total number of digits making up an international mobile subscriber identity.

The apparatus characterized in this way is particularly simple to implement, and it makes it possible to use a conventional SIM identity card, merely by masking n digits out of the digits making up the IMSI read from said SIM card: it is possible to distinguish between $10^n$ fixed user terminals by allocating IMSIs to them that are identical apart from the n digits.

In a preferred embodiment, at least one fixed radiotelephone includes means for identifying all of the calls containing an identity belonging to a predetermined set of international mobile subscriber identities, and for identifying all calls containing an identity belonging to a predetermined set of temporary mobile subscriber identities, both of the sets corresponding to the user terminals connected to the switch.

The apparatus characterized in this way does not require the GSM network used to be modified since it makes it possible to use a different IMSI, and a different TMSI, for each user terminal connected to the switch, as if it were a mobile radiotelephone terminal, even though the apparatus actually includes one or more fixed radiotelephone terminals, each of which is used in common by a certain number of user terminals. The GSM network can thus issue a distinct invoice for each fixed user terminal, as it does conventionally for mobile terminals.

In a preferred embodiment, the apparatus further includes means for extracting the directory number of the user terminal that is being called from the SETUP message received for setting up each call, and signalling means for sending said number to the switch so as to select the user terminal that is being called.

The apparatus characterized in this way makes it possible for a called user terminal to be selected directly when a call arrives, i.e. for direct inward dialing to be performed, without it being necessary to modify the GSM or GSM-derived network, even though such a function is not provided for in GSM Standards.

In a preferred embodiment, the apparatus further includes means for periodically performing a location procedure, for all of the international mobile subscriber identities (IMSIs) that correspond respectively to the user terminals that are connected to said switch, or for the corresponding temporary mobile subscriber identities (TMSIs) when such temporary identities have been allocated.

The apparatus characterized in this way makes it possible for the GSM network to determine the geographical zone in which the user terminals connected to a switch are located, by applying the conventional location procedure as used for GSM terminals, without it being necessary to modify the GSM or GSM-derived network.

BRIEF DESCRIPTION OF THE DRAWING

The invention is better understood and other characteristics appear from the following description and from the figures accompanying it. In the figures.

DETAILED DESCRIPTION OF THE INVENTION

Figure 1:
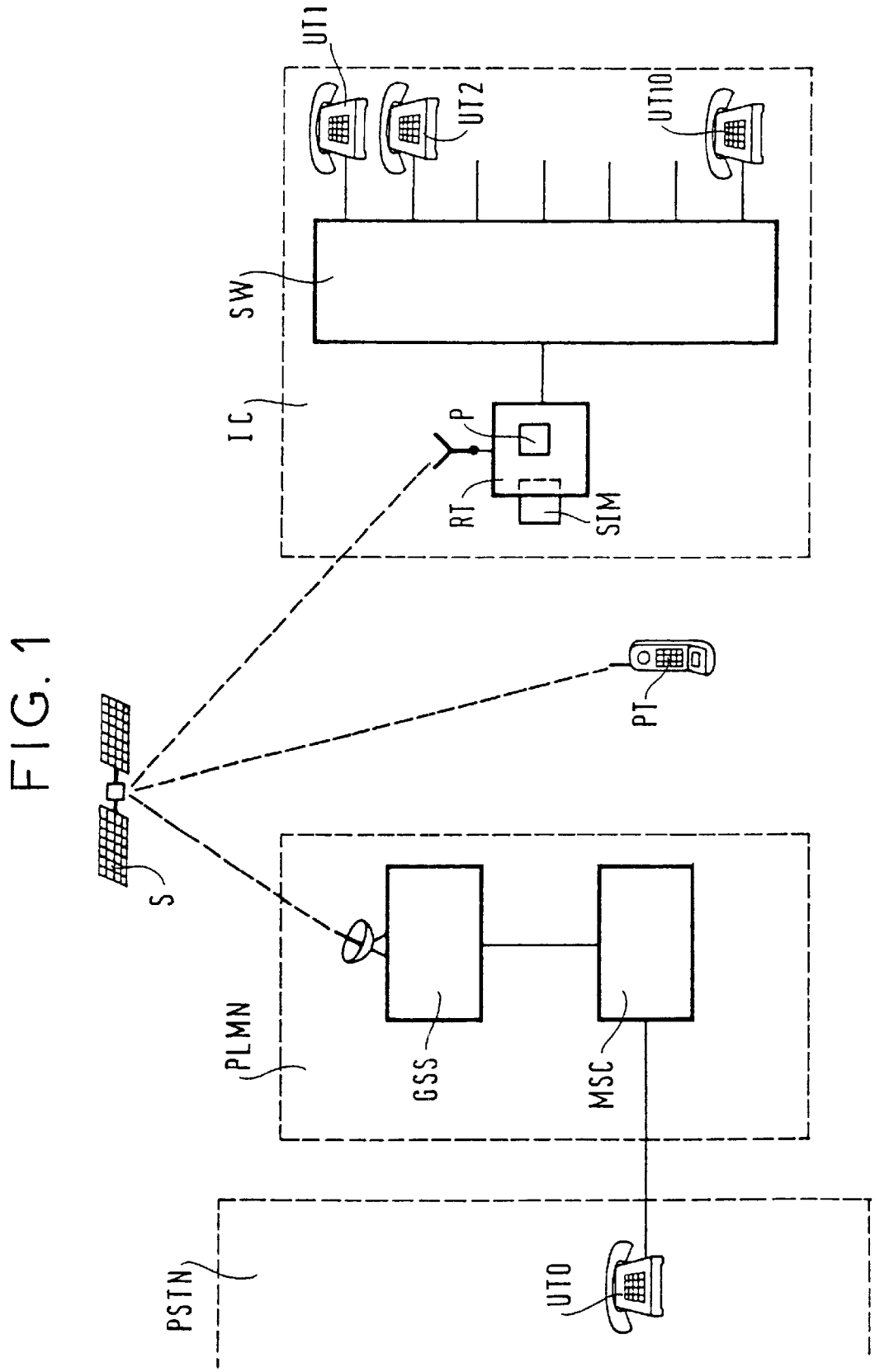
FIG. 1 is a diagram summarizing an embodiment of the apparatus of the invention, showing an example of how it can be used.

FIG. 1 is a diagram summarizing an example of how the apparatus of the invention may be used to provide the services of a Public Switched Telephone Network (PSTN) to a community situated in an isolated region. This isolated community IC is served by a switch SW to which, for example, ten conventional telephone terminals UT1, . . . , UT10 are connected. The switch SW is connected to a Public Switched Telephone Network (PSTN) via a Public Land Mobile Network (PLMN) of a type derived from the GSM type.

The PLMN includes a geostationary satellite or Low Earth Orbit (LEO) satellites, and it serves mainly mobile radiotelephone terminals or "portable telephones" PTs. A radio mobiles services switching center (MSC) is connected to a satellite S via a gateway G which maintains a radio link with the satellite S. The switch SW is connected via a conventional telephone cable to a fixed radiotelephone terminal RT. The fixed radiotelephone includes, in particular, apparatus for reading a subscriber identity module (SIM) card, and a processor P equipped with a program that determines how the terminal operates. The terminal RT operates in a manner identical to a conventional radiotelephone terminal of the GSM type or of a type derived therefrom, except for the identification function and the direct inward dialing function, which functions are specific to the apparatus of the invention. A preferred embodiment consists in using a conventional radiotelephone terminal by modifying only the program of the processor P, so as to implement the functions specific to the apparatus of the invention.

In this example, the terminal RT must identify a set of ten International Mobile Subscriber Identities (IMSIs) and a set of ten Temporary Mobile Subscriber Identities (TMSIs). To recognize the IMSIs, the conventional software is modified so as to mask a predetermined digit from the digits making up the IMSI read from the SIM card prior to comparing said IMSI with the IMSI contained in a received message. Thus, it is possible to distinguish ten fixed user terminals by allocating IMSIs to them that are identical apart from one digit.

The masked digit is useful to the PLMN. It makes it possible to distinguish between the ten fixed user terminals UT1, . . . , UT10, in particular so that their calls can be charged independently.

The conventional software is modified so as to:

store ten TMSIs, when any ten TMSIs are allocated by the PLMN respectively to the ten terminals UT1, . . . , UT10; and compare the TMSI contained in a received message with the ten stored TMSIs.

In other embodiments, in which the apparatus includes a plurality of fixed radio terminals, each of them may have a respective SIM card, but preferably with the same IMSI, so that any of the fixed radio terminals can be used for calls from any of the user terminals. In addition, it is necessary to provide means for coordinating all of the fixed radio terminals so as to prevent a plurality of terminals from answering the same call simultaneously.

The authentication function of the fixed radio terminal RT is performed conventionally because it authenticates the fixed radio terminal RT, rather than authenticating each user terminal individually. It uses a secret key contained in the SIM card and common to all of the user terminals UT1, . . . , UT10.

In other embodiments in which the apparatus includes a plurality of fixed radio terminals, each terminal may have a respective SIM card, but with the same secret key, so that any of the fixed radio terminals can be used for calls from any of the user terminals.

The direct inward dialing function is performed using the following method which does not require any modification of the PLMN, because provision is made for the method in the GSM Standard: the MSC sends a "SETUP" message which contains the directory number of the called user terminal, in compliance with GSM Standards; the software of the processor P is modified firstly to extract the directory number of the called user terminal from the SETUP message which is received for setting up each call, and secondly to send this number to the switch SW in the form of conventional signalling messages, so as to enable the switch to select the user terminal that is being called. In other embodiments in which the apparatus includes a plurality of fixed radio terminals, each of them is capable of performing this function.

Figure 2:
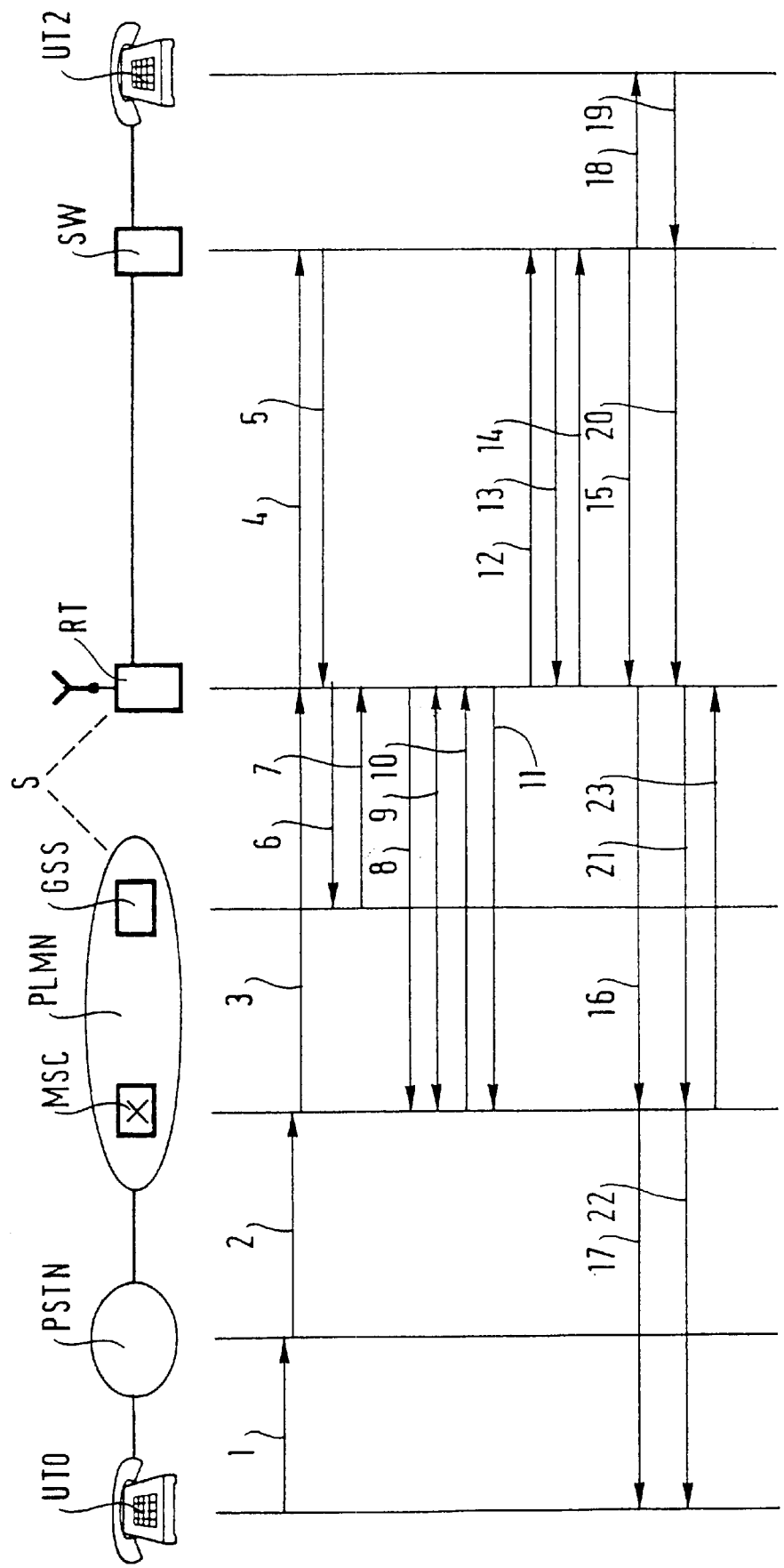
FIG. 2 is a timing diagram showing how the apparatus of the invention operates when setting up a call in said example.

FIG. 2 is a timing diagram showing how the apparatus of the invention operates, when setting up a call between a user terminal UT0 connected to the PSTN and a user terminal UT2 of the isolated community IC:

1) A user lifts the handset of the terminal UT0 and dials the directory number of the terminal UT2.

2) A switching center of the PSTN sends a message to a radio mobile services switching center (MSC) requesting it to set up a call with the terminal UT2 designated by the directory number.

3) The MSC consults the databases of the PLMN to find the IMSI or TMSI corresponding to the directory number, and to find the geographical zone in which the called terminal is located, in the same manner as for a conventional mobile terminal. The MSC then knows that the called terminal is located in one of the geographical zones served by the satellite S. Via the gateway G and via the satellite S, it transmits a search message to this zone to find the terminal designated by the IMSI or TMSI.

4) The fixed radiotelephone terminal RT receives this message. If the message contains an IMSI, the terminal RT compares the IMSI as received with the IMSI as stored in its SIM card, apart from one digit. If the message contains a TMSI, then the terminal RT compares the TMSI as received with those that are stored. It is thus capable of recognizing any one of the ten IMSIs or of the ten TMSIs corresponding to the terminals UT1, . . . , UT10. In this example, the compared identities match. It then sends a message to the switch SW to indicate thereto that a call is arriving.

5) The switch SW answers it with a message requesting transmission of the first digit of the directory number of the requested terminal.

6) The terminal RT sends a request to the gateway G via the satellite S for allocation of a radio channel for a telephone call.

7) The gateway G allocates a radio channel to the terminal RT.

8) The terminal RT then sends a positive reply to the search message to the MSC.

9) The terminal RT and the MSC then interchange messages to authenticate the terminal RT, using the standardized GSM procedure or a procedure derived therefrom. During this authentication procedure, the terminal RT uses the same secret key (contained in the SIM card) regardless of the terminal UT1, . . . , UT10 that is called. Then, they initialize enciphering/deciphering of the speech signals, using the standardized GSM procedure or a procedure derived therefrom. During this enciphering/deciphering procedure, the terminal RT uses the same enciphering key (computed on the basis of the secret key contained in the SIM card) regardless of the terminal UT1, . . . , UT10 that is called.

10) Then the MSC asks the terminal RT to set up the call, by sending it a "SETUP" message which contains the directory number of the called user terminal. The terminal RT sends it to the switch SW for the purpose of selecting the user terminal that is called.

11) The terminal RT sends confirmation to the MSC to confirm that the call has been set up.

12) The terminal RT sends the first digit of the directory number to the switch.

13) The switch SW acknowledges receipt of this first digit, and requests transmission of the second digit.

14) The terminal RT sends the second digit of the directory number to the switch.

15) This process is repeated until all of the digits have been transmitted to the switch SW. The switch then indicates to the terminal RT that it has received the full number. It then selects the user terminal UT2 that is called.

16) The terminal RT then sends an alarm message to the MSC.

17) The MSC re-transmits the alarm message to the PSTN.

18) Simultaneously, the switch SW sends a ringing signal to the called terminal UT2.

19) When someone lifts the handset of the terminal UT2, this terminal indicates to the switch SW that the handset has been lifted; The switch SW indicates to the terminal RT that the call has been answered.

21) The terminal RT requests the switching center MSC to connect the calling terminal UT0.

23) The MSC re-transmits this request to the PSTN, and then it gives the terminal RT confirmation that the request has been executed.

The scope of the invention is not limited to radiotelephone networks that use satellites and that are derived from GSM-type networks. The invention may be applied to conventional GSM-type networks.

What is claimed is:

1. A telephone interface system, comprising:

a telephone switch connected to a plurality of user terminals, each of said user terminals having a distinct identity, said telephone switch being free of a direct connection to a public land mobile network and free of a direct connection to a public switched telephone network;

a fixed radiotelephone terminal connected to said telephone switch and comprising:
an apparatus for reading a subscriber identity module (SIM) card;
a key stored on said SIM card;
means for communicating with a radiotelephone network; and
means for authenticating said radiotelephone terminal to said radiotelephone network using said key;

wherein:
said fixed radiotelephone terminal communicates calls of said plurality of user terminals with said radiotelephone network based on said distinct identity and in accordance with an authentication step performed by said means for authenticating; and
said means for authenticating performs said authentication step by using the same said key for calls of each one of said plurality of user terminals.

2. The system as set forth in claim 1, further comprising:

for each of said plurality of user terminals, there being associated in said fixed radiotelephone a corresponding unique respective international mobile subscriber identity; and each said international mobile subscriber identity for all of said plurality of user terminals being identical, except for n digits;

wherein said fixed radiotelephone comprises means for masking said n digits for said international mobile subscriber identity.

3. The system as set forth in claim 1, wherein:

said fixed radiotelephone further comprises:
means for identifying said calls as containing an identity belonging to a predetermined set of international mobile subscriber identities, and
means for identifying all said calls containing a call identity belonging to a predetermined set of temporary mobile subscriber identities; and each of said predetermined set of international mobile subscriber identities and each said predetermined set of temporary mobile subscriber identities corresponding to one of said plurality of user terminals.

4. The system as set forth in claim 1, wherein said fixed radiotelephone further comprises:

means for extracting, from a setup message received for setting up one of said calls, the directory number of one of said plurality of user terminals being called; and means for sending said directory number to said telephone switch;

said telephone switch selecting said one of said plurality of user terminals based on said directory number.

5. The system as set forth in claim 1, wherein:

said fixed radiotelephone further comprises means for periodically performing a location procedure;

for each of said plurality of user terminals, there is associated in said fixed radiotelephone a corresponding unique respective international mobile subscriber identity;

said location procedure is performed for each said international mobile subscriber identity associated in said fixed radiotelephone; and when said fixed radiotelephone has an association between a temporary mobile subscriber identity and one of said plurality of user terminals, said location procedure is performed for said temporary mobile subscriber identity.

6. The system as set forth in claim 1, wherein said fixed radiotelephone terminal operates in a manner identical to a conventional radiotelephone terminal of the GSM type, except for a control program of a processor of said fixed radiotelephone terminal.

* * * * *